(12) United States Patent
Nagatomi et al.

(10) Patent No.: US 12,348,078 B2
(45) Date of Patent: Jul. 1, 2025

(54) BACKUP POWER SUPPLY SYSTEM AND MOVING VEHICLE

(71) Applicant: Panasonic Intellectual Property Management Co., Ltd., Osaka (JP)

(72) Inventors: Yuta Nagatomi, Osaka (JP); Masafumi Nakamura, Osaka (JP); Masatoshi Nakase, Osaka (JP); Hiroki Akashi, Osaka (JP); Kinya Kato, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/253,345

(22) PCT Filed: Nov. 29, 2021

(86) PCT No.: PCT/JP2021/043704
§ 371 (c)(1),
(2) Date: May 17, 2023

(87) PCT Pub. No.: WO2022/114197
PCT Pub. Date: Jun. 2, 2022

(65) Prior Publication Data
US 2023/0420981 A1 Dec. 28, 2023

(30) Foreign Application Priority Data
Nov. 30, 2020 (JP) ................................ 2020-199101

(51) Int. Cl.
*H02J 9/06* (2006.01)
*B60L 3/00* (2019.01)
*B60R 16/033* (2006.01)

(52) U.S. Cl.
CPC ............ *H02J 9/061* (2013.01); *B60L 3/0046* (2013.01); *B60R 16/033* (2013.01)

(58) Field of Classification Search
CPC ....................................................... H02J 9/061
See application file for complete search history.

(56) References Cited

U.S. PATENT DOCUMENTS

| | | | |
|---|---|---|---|
| 7,336,002 B2 * | 2/2008 | Kato ..................... | H02J 7/1423 |
| | | | 307/10.6 |
| 9,431,850 B2 * | 8/2016 | Imai ..................... | H02J 7/1423 |
| (Continued) | | | |

FOREIGN PATENT DOCUMENTS

| JP | S56-089633 U1 | 7/1981 |
|---|---|---|
| JP | 5556560 B2 | 7/2014 |
| (Continued) | | |

OTHER PUBLICATIONS

International Search Report dated Feb. 15, 2022 issued in International Patent Application No. PCT/JP2021/043704 with English translation.

*Primary Examiner* — Daniel Kessie
(74) *Attorney, Agent, or Firm* — Rimon P.C.

(57) ABSTRACT

A backup power supply system is designed to supply, when a power supply has caused a failure, power from a first electrical storage device to a plurality of loads. The plurality of loads includes a first load and a second load. The first load is connected to a first power supply line. The backup power supply system includes a backflow prevention switch provided between the first load and the second load on the first power supply line and making the first power supply line electrically conductive or non-conductive by turning ON and OFF. The backflow prevention switch includes an internal diode having an anode connected to one side including the first load and a cathode connected to the other side including the second load.

16 Claims, 6 Drawing Sheets

(56) References Cited

U.S. PATENT DOCUMENTS

| | | |
|---|---|---|
| 2019/0173274 A1 | 6/2019 | Fukae |
| 2020/0313457 A1 | 10/2020 | Kozuki |
| 2021/0253050 A1 | 8/2021 | Kambara |
| 2022/0166249 A1* | 5/2022 | Shindo .................. B60R 16/033 |

FOREIGN PATENT DOCUMENTS

| | | |
|---|---|---|
| JP | 2017-216795 A | 12/2017 |
| JP | 2019-214312 A | 12/2019 |
| JP | 2020-162286 A | 10/2020 |

* cited by examiner

FIG. 3

|  | Bypass Switch | Second Switch | First Switch | Backflow Prevention Switch |
|---|---|---|---|---|
| When power supply operates properly | ON | OFF | OFF | OFF |
| When power supply causes failure | OFF | ON | ON | ON |
| When power supply recovers | OFF | ON | OFF | OFF |

BACKUP POWER SUPPLY SYSTEM AND MOVING VEHICLE

CROSS-REFERENCE OF RELATED APPLICATIONS

This application is the U.S. National Phase under 35 U.S.C. § 371 of International Patent Application No. PCT/JP2021/043704, filed on Nov. 29, 2021, which in turn claims the benefit of Japanese Patent Application No. 2020-199101, filed on Nov. 30, 2020, the entire disclosures of which Applications are incorporated by reference herein.

TECHNICAL FIELD

The present disclosure generally relates to a backup power supply system and a moving vehicle. More particularly, the present disclosure relates to a backup power supply system for supplying power to a plurality of loads when a power supply has caused a failure and also relates to a moving vehicle including such a backup power supply system.

BACKGROUND ART

Patent Literature 1 discloses a vehicle power supply device (backup power supply system). The vehicle power supply device supplies power from a battery (power supply) and a capacitor (first electrical storage device) to a group of loads. The vehicle power supply device includes: an FET (bypass switch) connected to the battery and the group of loads; a second switch (second switch) and a fourth switch (first switch) which are connected to the capacitor and the group of loads; a battery voltage detector for detecting an output voltage value of the battery; a capacitor voltage detector for detecting an output voltage value of the capacitor; and a control unit. The control unit turns the FET, the second switch, and the fourth switch ON and OFF based on a result of comparison between the respective detected voltage values of the battery voltage detector and the capacitor voltage detector.

CITATION LIST

Patent Literature

Patent Literature 1: JP 5556560 B2

SUMMARY OF INVENTION

In the vehicle power supply device, to ensure a voltage an a current to be supplied to a particular load, a battery-side section of a particular load may be provided with a backflow prevention diode to prevent a current flowing through the particular load from flowing backward. In that case, however, a voltage drop caused by the backflow prevention diode sometimes makes it difficult to ensure, using only the output voltage of the capacitor, the voltage to be supplied to the particular load.

Also, in the vehicle power supply device, when the battery has caused a failure, the FET is turned OFF and the second and fourth switches are both turned ON, thereby supplying an output current of the capacitor to the group of loads via the second switch and the fourth switch. If the battery recovered from the failure in this state, however, an output current of the battery may flow backward via the second and fourth switches into the capacitor.

In view of the foregoing background, it is therefore an object of the present disclosure to provide a backup power supply system and moving vehicle having the ability to reduce the chances of the output voltage of an electrical storage device causing a voltage drop on a power supply line or prevent an output current of a power supply from flowing into the electrical storage device when the power supply recovers from a failure.

A backup power supply system according to an aspect of the present disclosure is designed to supply, when a power supply has caused a failure, power from a first electrical storage device to a plurality of loads. The power supply is connected to not only a first power supply line but also the plurality of loads through the first power supply line. The first electrical storage device is connected to not only a second power supply line connected to the first power supply line but also the plurality of loads through the first power supply line. The plurality of loads includes a first load and a second load. The first load is connected to the first power supply line. The backup power supply system includes a backflow prevention switch. The backflow prevention switch is provided between the first load and the second load on the first power supply line and makes the first power supply line electrically conductive or non-conductive by turning ON and OFF. The backflow prevention switch includes an internal diode having an anode connected to one side including the first load and a cathode connected to the other side including the second load.

A backup power supply system according to another aspect of the present disclosure is designed to, when a power supply has caused a failure, supply power from a first electrical storage device to a plurality of loads. The power supply is connected to not only a first power supply line but also the plurality of loads through the first power supply line. The first electrical storage device is connected to not only a second power supply line connected to the first power supply line but also the plurality of loads through the first power supply line. The backup power supply system includes a first switch, a first detector circuit, and a second detector circuit. The first switch is provided on the second power supply line and makes the second power supply line electrically conductive or non-conductive by turning ON and OFF. The first detector circuit and the second detector circuit detect, under mutually different detection conditions, the failure caused by the power supply and output respective detection results. The first switch is controlled based on the respective detection results provided by the first detector circuit and the second detector circuit.

A moving vehicle according to still another aspect of the present disclosure includes the backup power supply system described above and a moving vehicle body.

The present disclosure achieves the advantage of reducing the chances of the output voltage of an electrical storage device causing a voltage drop on a power supply line or preventing an output current of a power supply from flowing backward into the electrical storage device when the power supply recovers from a failure.

BRIEF DESCRIPTION OF DRAWINGS

FIG. 3 shows exemplary ON/OFF state combinations of respective switches;

DESCRIPTION OF EMBODIMENTS

(1) First Embodiment (1-1) Overview A backup power supply system 1 according to an exemplary embodiment will be described with reference to the accompanying drawings. Note that the embodiment to be described below is only an exemplary one of various embodiments of the present disclosure and should not be construed as limiting. Rather, the exemplary embodiment may be readily modified in various manners depending on a design choice or any other factor without departing from a true spirit and scope of the present disclosure.

Figure 1:
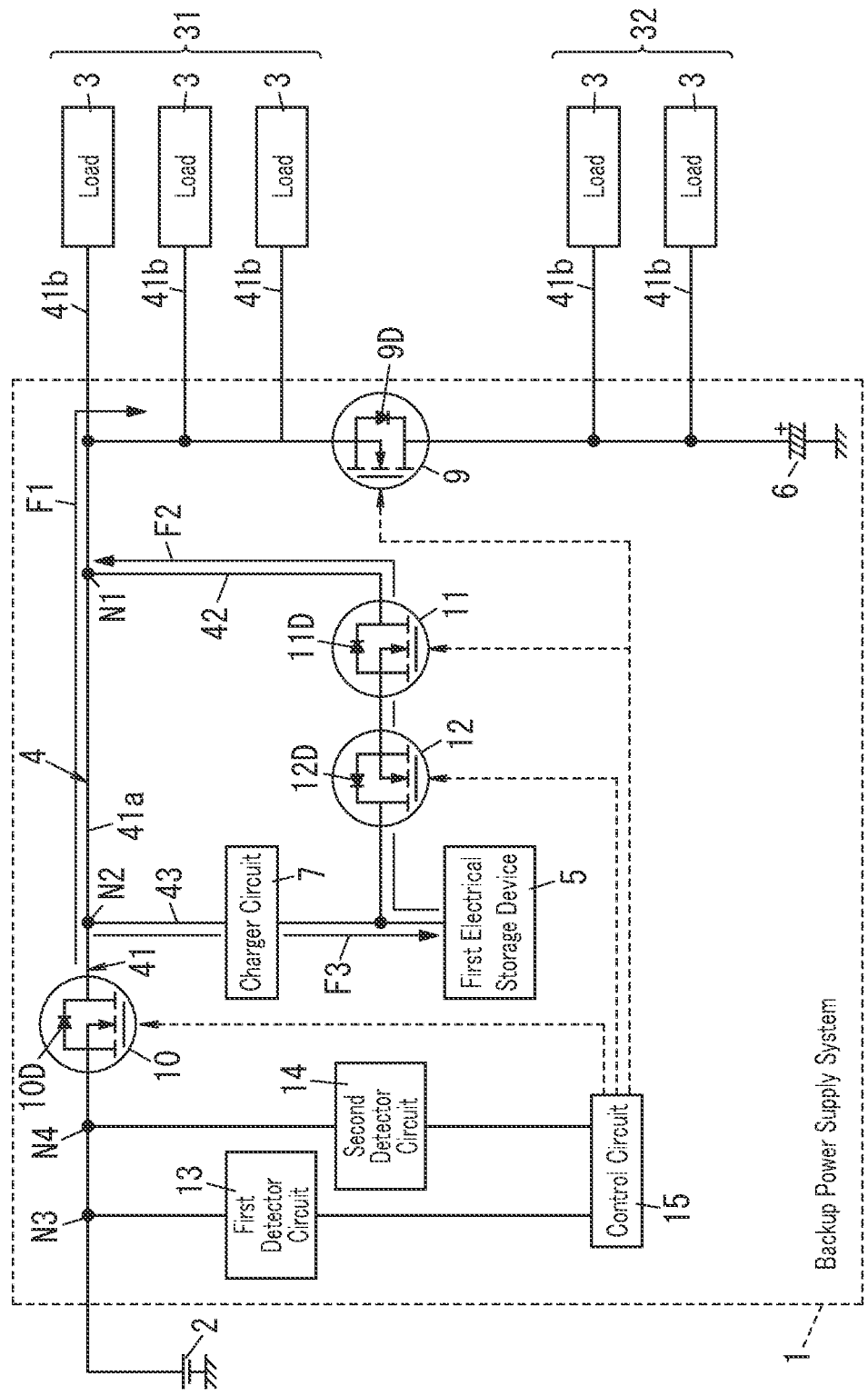
FIG. 1 is a block diagram of a backup power supply system according to a first embodiment.
Figure 2:
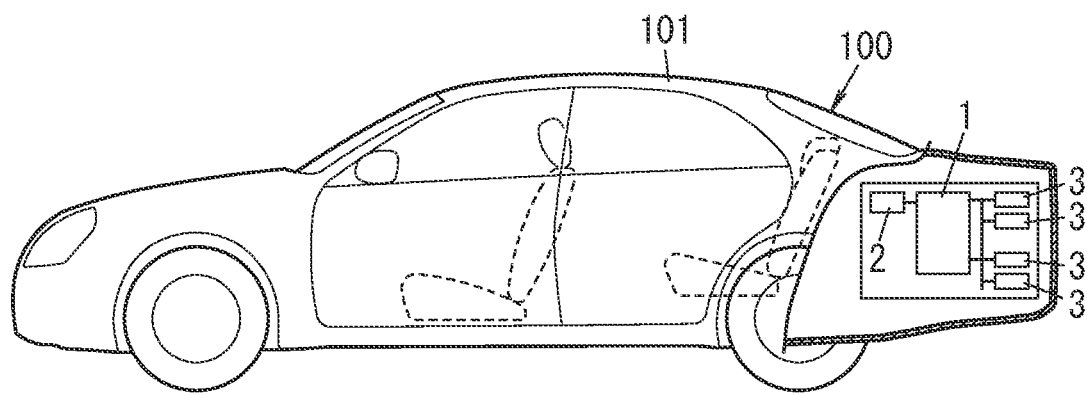
FIG. 2 is a partially cutaway side view of a vehicle equipped with the backup power supply system.

As shown in FIG. 1, the backup power supply system 1 may be installed in, for example, a vehicle 100 (refer to FIG. 2). If the power supply 2 (such as a battery) has caused a failure, the backup power supply system 1 supplies power from a first electrical storage device 5 to a plurality of loads 3. This allows the plurality of loads 3 to operate continuously with the power supplied from the first electrical storage device 5 even if the power supply 2 has caused a failure. As used herein, the expression "the power supply 2 causes a failure" refers to a situation where the supply of power from the power supply 2 to the loads 3 is discontinued due to, for example, a failure, deterioration, or disconnection of the power supply 2. In other words, the expression "the power supply 2 causes a failure" refers to a situation where the output voltage of the power supply 2 becomes less than a threshold value.

As can be seen, the backup power supply system 1 is installed in the vehicle 100 including the power supply 2 and the plurality of loads 3. That is to say, the vehicle 100 (moving vehicle) includes a vehicle body 101 (moving vehicle body), the power supply 2, the plurality of loads 3, and the backup power supply system 1. In the following description of embodiments, a situation where the backup power supply system 1 is installed in the vehicle 100 will be described as an example. However, this is only an example and should not be construed as limiting.

Alternatively, the backup power supply system 1 may also be installed in any other suitable type of moving vehicle (such as an aircraft, a watercraft, or a railway train), instead of the vehicle 100.

The plurality of loads 3 includes a first load 31 and a second load 32.

The first load 31 includes a plurality of loads 3 that satisfies a condition (hereinafter referred to as a "first condition") that the loads 3 have greater power consumption (i.e., requires a larger operating current) than the second load 32. As used herein, the "operating current" refers to an electric current to be supplied to allow the load 3 to operate. Also, a "minimum guaranteed operating voltage" as used herein refers to a minimum required voltage to be supplied for the loads 3 to operate. That is to say, the first load 31 is a load which requires a larger operating current, but of which the operating voltage may decrease to a certain degree (i.e., which allows its operating voltage to decrease to a certain degree). Specifically, examples of the first load 31 include power system (in other words, non-control system) loads 3 (such as a braking system for vehicles and an electronic power steering system for vehicles). In addition, the first load 31 also includes an actuator to be energized with power supplied.

The second load 32 includes a plurality of loads 3 that satisfy a condition that the loads 3 have smaller power consumption (i.e., requires a smaller operating current) than the first load 31. That is to say, the second load 32 is a load which requires a smaller operating current, but which requires a relatively high operating voltage (i.e., which does not allow the operating voltage to be less than the minimum guaranteed operating voltage in any condition (i.e., even when the power supply 2 has caused a failure). Specifically, examples of the second load 32 include control system loads 3 for controlling the actuator. Examples of the control system loads 3 include an electronic control unit (ECU) for a braking system, an ECU for an electronic power steering system, and devices related to advanced driver assistance systems (ADAS).

The backup power supply system 1 according to this embodiment includes a backflow prevention switch 9. The backflow prevention switch 9 is provided between the first load 31 and the second load 32 on a power supply line 4 that connects the power supply 2 to the plurality of loads 3. The backflow prevention switch 9 includes an internal diode (which will be hereinafter also referred to as a "parasitic diode") 9D. The internal diode 9D has its anode connected to one side including the first load 31 and has its cathode connected to the other side including the second load 32. As used herein, the expression "the anode of the internal diode 9D is connected to one side including the first load 31" means that the anode of the internal diode 9D is connected to the first load 31 either directly or indirectly. Likewise, as used herein, the expression "the cathode of the internal diode 9D is connected to the other side including the second load 32" means that the cathode of the internal diode 9D is connected to the second load 32 either directly or indirectly.

The backup power supply system 1 enables, by turning the backflow prevention switch 9 ON when supplying power from the first electrical storage device 5 to the plurality of loads 3, reducing the chances of the output voltage of the first electrical storage device 5 causing a voltage drop at the backflow prevention switch 9 (more specifically, at the internal diode 9D). This enables, when the first electrical storage device 5 supplies power, supplying a voltage to the second load 32 (as a particular load) while reducing the chances of the output voltage of the first electrical storage device 5 causing a voltage drop on the power supply line.

In addition, the backup power supply system 1 according to this embodiment further includes a first detector circuit 13 and a second detector circuit 14 and a first switch 11. The first detector circuit 13 and the second detector circuit 14 detect, under mutually different detection conditions, a failure caused by the power supply 2 and output the detection results. The first switch 11 is controlled based on the detection results provided by the first detector circuit 13 and the second detector circuit 14. This configuration enables turning the first switch 11 OFF when the power supply 2 recovers from the failure. Thus, turning the first switch 11 OFF when the power supply 2 recovers from the failure enables preventing the output current of the power supply 2 from being diverted into a backup power supply line (i.e., the second power supply line 42) and flowing into the first electrical storage device 5. Next, the backup power supply system 1 having such a configuration will be described in further detail.

(1-2) Detailed Description of Backup Power Supply System

As shown in FIG. 1, when the power supply 2 is operating properly (i.e., when the power supply 2 has caused no failure), the backup power supply system 1 supplies the output power of the power supply 2 to the plurality of loads 3. On the other hand, when the power supply 2 has caused a failure, the backup power supply system 1 supplies the respective output powers of the first electrical storage device 5 and a second electrical storage device 6, instead of the output power of the power supply 2, to the plurality of loads 3. The backup power supply system 1 includes the power supply line 4, the first electrical storage device 5, the second electrical storage device 6, a charger circuit 7, a bypass switch 10, the backflow prevention switch 9, the first switch 11, a second switch 12, the first detector circuit 13, the second detector circuit 14, and a control circuit 15. Alternatively, the first electrical storage device 5 and the second electrical storage device 6 do not have to be counted among the constituent elements of the backup power supply system 1.

(1-2-1) Power Supply Line

The power supply line 4 is an electrical path for supplying the output power of the power supply 2 to the plurality of loads 3 and the first electrical storage device 5 and supplying the output power of the first electrical storage device 5 to the plurality of loads 3. The power supply line 4 includes a first power supply line 41, a second power supply line 42, and a third power supply line 43.

The first power supply line 41 is an electrical path for supplying the output power of the power supply 2 to the plurality of loads 3 (as indicated by the arrow F1 in FIG. 1). The first power supply line 41 includes a main electrical path 41a and a plurality of branch paths 41b. The main electrical path 41a is connected to an output unit of the power supply 2. The plurality of branch paths 41b are provided for the plurality of loads 3, respectively. The plurality of branch paths 41b are branched from multiple different nodes of the main electrical path 41a and connected to their corresponding loads 3. The first load 31 is connected to a node, upstream of the second load 32 (i.e., closer to the power supply 2), of the main electrical path 41a. The second load 32 is connected to a node, downstream of the first load 31, of the main electrical path 41a. That is to say, the first load 31 requiring a large current is connected upstream of the second load 32 requiring no large current. The first power supply line 41 is provided with the bypass switch 10, the backflow prevention switch 9, and the second electrical storage device 6. The bypass switch 10, the backflow prevention switch 9, and the second electrical storage device 6 will be described in detail later.

The second power supply line 42 is an electrical path for supplying the output power of the first electrical storage device 5 to the plurality of loads 3 not via the charger circuit 7 (as indicated by the arrow F2 in FIG. 1). The second power supply line 42 connects an input/output interface of the first electrical storage device 5 to a first branch node N1 of the first power supply line 41. The first branch node N1 is located between the bypass switch 10 and the plurality of loads 3 on the main electrical path 41a. The second power supply line 42 is provided with the first switch 11 and the second switch 12. The first switch 11 and the second switch 12 will be described in detail later.

The third power supply line 43 is an electrical path for supplying the output power of the power supply 2 to the first electrical storage device 5 via the charger circuit 7 (as indicated by the arrow F3 in FIG. 1). The third power supply line 43 connects a second branch node N2 of the main electrical path 41a to the input/output interface of the first electrical storage device 5. The second branch node N2 is located between the bypass switch 10 and the first branch node N1 on the first power supply line 41. The third power supply line 43 is provided with the charger circuit 7. The charger circuit 7 will be described in detail later.

(1-2-2) First Electrical Storage Device and Second Electrical Storage Device

The first electrical storage device 5 is provided as a backup power supply (i.e., an auxiliary or reserve power supply) for the power supply 2. In other words, the first electrical storage device 5 is a power supply which may supply power (i.e., voltage and current) to the plurality of loads 3 in a situation where the power supply 2 has caused a failure. The first electrical storage device 5 may be, for example, an electrical double layer capacitor (EDLC). The first electrical storage device 5 may be made up of two or more electrical storage devices (such as EDLCs) which are electrically connected to each other in parallel, in series, or in parallel and series. That is to say, the first electrical storage device 5 may be implemented as a parallel or series circuit of two or more electrical storage devices or a combination thereof.

The second electrical storage device 6 is provided as a backup power supply (i.e., an auxiliary or reserve power supply) for the power supply 2. More specifically, the second electrical storage device 6 is a power supply which may supply power (i.e., voltage and current) to the second load 32 in a situation where the power supply 2 has caused a failure. The second electrical storage device 6 may be a capacitor, for example, and may also be, as well as the first electrical storage device 5, an electrical double layer capacitor (EDLC). The charging capacity of the second electrical storage device 6 is smaller than the charging capacity of the first electrical storage device 5. The second electrical storage device 6 is provided on the first power supply line 41 (more specifically, on the main electrical path 41a) on a cathode side of the backflow prevention switch 9 (more specifically, downstream of the second load 32, for example).

The second electrical storage device 6 is charged with the output voltage applied from the power supply 2 through the first power supply line 41 when the power supply 2 is operating properly. On the other hand, when the power supply 2 has caused a failure, the output voltage of the power supply 2 becomes lower than the charging voltage of the second electrical storage device 6, and therefore, the output voltage of the second electrical storage device 6 is supplied to the second load 32. This allows, when the power supply 2 has caused a failure, supplying the output voltage of the second electrical storage device 6 to the second load 32 instantaneously instead of the output voltage of the power supply 2.

(1-2-3) Charger Circuit

The charger circuit 7 is a circuit for charging the first electrical storage device 5 by transforming (e.g., boosting) the output voltage of the power supply 2, maintaining the voltage at a constant voltage (e.g., 15 V), and outputting the constant voltage to the first electrical storage device 5. The charger circuit 7 may be, for example, a step-up/down DC-DC converter. The charger circuit 7 is provided on the third power supply line 43. The output voltage of the charger circuit 7 may be higher than the output voltage (e.g., 12 V) of the power supply 2 This enables making the voltage of the first electrical storage device 5 fully charged higher than the output voltage of the power supply 2. Consequently, the output current and output voltage supplied from the first electrical storage device 5 to the loads 3 through the second power supply line 42 may be a sufficiently large current and a sufficient high voltage.

(1-2-4) Bypass Switch

The bypass switch 10 is provided on the main electrical path 41a of the first power supply line 41 and turned ON and OFF under the control of the control circuit 15, thus making the main electrical path 41a electrically conductive or non-conductive. Making the main electrical path 41a electrically non-conductive prevents the output current of the first electrical storage device 5 from flowing into the power supply 2 when the power supply 2 has caused a failure. The bypass switch 10 is provided, for example, between the power supply 2 and the second branch node N2 on the main electrical path 41a. The bypass switch 10 may be, for example, a semiconductor switch (such as an n-channel metal-oxide semiconductor field effect transistor (MOSFET)).

The bypass switch 10 includes an internal diode 10D (hereinafter also referred to as a "parasitic diode"). The internal diode 10D is connected in parallel between the source and drain (i.e., between electrically conductive and non-conductive parts) of the bypass switch 10. A node between the source and drain of the bypass switch 10 is connected to the first power supply line 41 in series. The anode of the internal diode 10D (i.e., the source of the bypass switch 10) is connected to a positive electrode of the power supply 2. The cathode of the internal diode 10D (i.e., the drain of the bypass switch 10) is connected to the plurality of loads 3. This enables, when the bypass switch 10 turns OFF, preventing the output current of the first electrical storage device 5 from flowing backward toward, and flowing into, the power supply 2. In addition, the internal diode 10D allows the output current of the power supply 2 to be always supplied to the plurality of loads 3 via the bypass switch 10, no matter whether the bypass switch 10 is ON or OFF.

(1-2-5) First Switch and Second Switch

The first switch 11 and the second switch 12 are provided on the second power supply line 42 and are turned ON and OFF under the control of the control circuit 15, thus making the second power supply line 42 electrically conductive or non-conductive. Making the second power supply line 42 electrically conductive or non-conductive starts and stops supplying power from the first electrical storage device 5 to the plurality of loads 3. The first switch 11 and the second switch 12 are connected to each other in series on the second power supply line 42. The first switch 11 and the second switch 12 may be, for example, semiconductor switches (such as n-channel metal-oxide semiconductor field effect transistors (MOSFETs)).

Each of the first switch 11 and the second switch 12 includes an internal diode (hereinafter also referred to as a "parasitic diode") 11D, 12D. The internal diode 11D is connected in parallel between the source and drain (i.e., between electrically conductive and non-conductive parts) of the first switch 11. The internal diode 12D is connected in parallel between the source and drain (i.e., between electrically conductive and non-conductive parts) of the second switch 12. A node between the source and drain of the first switch 11 and a node between the source and drain of the second switch 12 are connected to the second power supply line 42 in series. A current flows in mutually opposite directions through the two internal diodes 11D, 12D. More specifically, the cathode of the internal diode 11D (i.e., the drain of the first switch 11) is connected to one side including the first power supply line 41 and the anode of the internal diode 11D (i.e., the source of the first switch 11) is connected to the other side including the first electrical storage device 5 (i.e., the other side including the second switch 12). Thus, turning the first switch 11 OFF enables preventing the output current of the power supply 2 from being diverted into the second power supply line 42 and flowing through the internal diode 11D of the first switch 11 into the first electrical storage device 5. Note that the expression "the cathode of the internal diode 11D is connected to the one side including the first power supply line 41" means that the cathode of the internal diode 11D is connected to the first power supply line 41 either directly or indirectly. Also, the expression "the anode of the internal diode 11D is connected to the other side including the first electrical storage device 5" means that the anode of the internal diode 11D is connected to the first electrical storage device 5 either directly or indirectly.

Also, the cathode of the internal diode 12D (i.e., the drain of the second switch 12) is connected to one side including the first electrical storage device 5 and the anode of the internal diode 12D (i.e., the source of the second switch 12) is connected to the other side including the first power supply line 41 (i.e., the other side including the first switch 11). Thus, turning the second switch 12 OFF enables preventing the output current of the first electrical storage device 5 from flowing through the internal diode 12D of the second switch 12 into the first power supply line 41. Note that the expression "the cathode of the internal diode 12D is connected to the one side including the first electrical storage device 5" means that the cathode of the internal diode 12D is connected to the first electrical storage device 5 either directly or indirectly. Also, the expression "the anode of the internal diode 12D is connected to the other side including the first power supply line 41" means that the anode of the internal diode 12D is connected to the first power supply line 41 either directly or indirectly.

(1-2-6) Backflow Prevention Switch

The backflow prevention switch 9 is a switch that prevents a current supplied from the second electrical storage device 6 to the second load 32 from flowing backward toward the first load 31. The backflow prevention switch 9 may be, for example, a semiconductor switch (such as an n-channel metal-oxide semiconductor field effect transistor (MOSFET)).

The backflow prevention switch 9 is provided between the first load 31 and the second load 32 on the first power supply line 41 and turned ON and OFF under the control of the control circuit 15, thereby making the first power supply line 41 either electrically conductive or non-conductive (i.e., making the source and drain of the backflow prevention switch 9 either electrically conductive or non-conductive). In addition, the backflow prevention switch 9 includes an internal diode (hereinafter also referred to as a "parasitic diode") 9D. The anode of the internal diode 9D is connected to one side including the first load 31 and the cathode of the internal diode 9D is connected to the other side including the second load 32.

When turned OFF, the backflow prevention switch 9 makes the first power supply line 41 electrically non-conductive (i.e., makes the drain and source of the backflow prevention switch 9 electrically non-conductive) to let the internal diode 9D function as a backflow prevention diode. A state where this function is enabled will be hereinafter also referred to as a "backflow prevention mode." On the other hand, when turned ON, the backflow prevention switch 9 makes the first power supply line 41 electrically conductive to function as an electrical path that causes a lower voltage drop than the one caused by the internal diode 9D (hereinafter referred to as a "low-voltage conductive path"). A state where this function is enabled will be hereinafter referred to as a "low-voltage conductive mode."

That is to say, the backflow prevention switch 9 has two modes, namely, the backflow prevention mode and the low-voltage conductive mode. As will be described later, when the power supply 2 is operating properly, the backflow prevention switch 9 is turned OFF to enter the backflow prevention mode and prevent the current flowing toward the second load 32 (i.e., the output current of the second electrical storage device 6) from flowing backward toward the first load 31. On the other hand, when the power supply 2 has caused a failure, the backflow prevention switch 9 is turned ON to enter the low-voltage conductive mode and make the output voltage of the first electrical storage device 5 suppliable to the second load 32 by reducing the voltage drop at the backflow prevention switch 9. This ensures that the voltage supplied from the first electrical storage device 5 to the second load 32 is at least equal to, or higher than, the minimum guaranteed operating voltage for the second load 32.

(1-2-7) First Detector Circuit and Second Detector Circuit

The first detector circuit 13 and the second detector circuit 14 detect, under mutually different detection conditions, any failure caused by the power supply 2 and output the result of detection. The first detector circuit 13 and the second detector circuit 14 are connected at respective branch nodes (namely, a third branch node N3 and a fourth branch node N4) between the power supply 2 and the bypass switch 10 on the first power supply line 41. The first detector circuit 13 and the second detector circuit 14 respectively detect the voltage at the third branch node N3 and the fourth branch node N4 (i.e., the output voltage of the power supply 2) and detect, based on the voltage thus detected, any failure caused by the power supply 2.

The first detector circuit 13 has a masking function and a latching function, and determines, based on the masking function and the latching function, whether the power supply 2 has caused any failure and outputs the decision to the control circuit 15.

As used herein, the masking function refers to the function of detecting, when finding the output voltage of the power supply 2 remaining equal to or greater than a threshold value for a predetermined time, that the power supply 2 is operating properly and outputting the result of detection and detecting, when finding the output voltage of the power supply 2 remaining less than the threshold value for the predetermined time (e.g., 100 microseconds (μs)), that the power supply 2 has caused a failure and outputting the result of detection. This masking function may reduce the chances of the failure of the power supply 2 being detected erroneously due to noise generated in the output voltage of the power supply 2. That is to say, the predetermined period for use in the masking function is set longer than a period in which noise is generated in the output voltage of the power supply 2. The latching function as used herein refers to the function of outputting, once the first detector circuit 13 has detected any failure caused by the power supply 2, the result of detection continuously and fixedly.

The masking function and the latching function define a detection condition (hereinafter referred to as a "first detection condition") that the first detector circuit 13 that has detected any failure caused by the power supply 2 should follow when outputting the result of detection. That is to say, following the first detection condition defined by the masking function and the latching function, the first detector circuit 13 detects a failure caused by the power supply 2 when finding the output voltage of the power supply 2 remaining less than the threshold value for the predetermined time and outputs the result of detection continuously and fixedly once detecting any failure caused by the power supply 2.

The second detector circuit 14 has neither the masking function nor the latching function of the first detector circuit 13. The second detector circuit 14 outputs, whenever detecting any failure caused by the power supply 2, the result of detection to the control circuit 15. More specifically, when finding the output voltage of the power supply 2 equal to or greater than the threshold value, the second detector circuit 14 detects that the power supply 2 is operating properly and outputs the result of detection. On the other hand, when finding the output voltage of the power supply 2 less than the threshold value, the second detector circuit 14 detects the failure caused by the power supply 2 and outputs the result of detection. The second detector circuit 14 will output the same result of detection continuously until the second detector circuit 14 makes the next detection.

In this embodiment, the threshold value used by the second detector circuit 14 is the same as the threshold value used by the first detector circuit 13. However, this is only an example and should not be construed as limiting. Alternatively, the threshold value used by the second detector circuit 14 may be different from the threshold value used by the first detector circuit 13.

The second detector circuit 14 has neither the masking function nor the latching function, and therefore, may detect any failure caused by the power supply 2 more quickly than the first detector circuit 13 (i.e., instantaneously). In addition, the second detector circuit 14 has neither the masking function nor the latching function, and therefore, outputs a result of detection whenever detecting any failure caused by the power supply 2 by following a different detection condition (hereinafter referred to as a "second detection condition") from the first detection condition. As can be seen, according to this embodiment, the first detector circuit 13 and the second detector circuit 14 detect, under mutually different detection conditions, any failure caused by the power supply 2.

(1-2-8) Control Circuit

The control circuit 15 controls the bypass switch 10, the first switch 11, the second switch 12, and the backflow prevention switch 9.

More specifically, the control circuit 15 controls the bypass switch 10 and the second switch 12 in accordance with only the detection result provided by the first detector circuit 13, out of the first detector circuit 13 and the second detector circuit 14. At that time, when finding the detection result provided by the first detector circuit 13 is "operating properly" (i.e., if the detection result indicates that the power supply 2 is operating properly), the control circuit 15 turns the bypass switch 10 ON and turns the second switch 12 OFF. On the other hand, when finding that the detection result provided by the first detector circuit 13 is "failure" (i.e., if the detection result indicates that the power supply 2 has caused a failure), the control circuit 15 turns the bypass switch 10 OFF and turns the second switch 12 ON. That is to say, the ON/OFF state of the bypass switch 10 is opposite from the ON/OFF state of the second switch 12.

In addition, the control circuit 15 controls the first switch 11 and the backflow prevention switch 9 based on both the detection results provided by the first detector circuit 13 and the second detector circuit 14. In that case, if the detection results provided by the first detector circuit 13 and the second detector circuit 14 both indicate "failure," then the control circuit 15 turns the first switch 11 and the backflow prevention switch 9 ON. Otherwise, the control circuit 15 turns the first switch 11 and the backflow prevention switch 9 OFF.

Note that the expression "otherwise" refers to a situation where neither of the detection results provided by the first detector circuit 13 and the second detector circuit 14 indicates "failure." Specifically, the expression "otherwise" refers to a situation where the detection result provided by the first detector circuit 13 indicates "operating properly" and the detection result provided by the second detector circuit 14 indicates "failure," a situation where the detection result provided by the first detector circuit 13 indicates "failure" and the detection result provided by the second detector circuit 14 indicates "operating properly," and a situation where both of the detection results provided by the first detector circuit 13 and the second detector circuit 14 indicate "operating properly."

The control circuit 15 is implemented as for example, a microcomputer including a processor and a memory. That is to say, the control circuit 15 is implemented as a computer system including a processor and a memory. The computer system performs the function of the control circuit 15 by making the processor execute an appropriate program. The program may be stored in advance in the memory. Alternatively, the program may also be downloaded via a telecommunications line such as the Internet or distributed after having been stored in a non-transitory storage medium such as a memory card. In this embodiment, the control circuit 15 is configured to perform digital control using a microcomputer. Alternatively, the control circuit may also be configured to perform analog control without using any microcomputer.

As can be seen, the control circuit 15 controls, based on the detection results provided by the first detector circuit 13 and the second detector circuit 14, the bypass switch 10, the first switch 11, the second switch 12, and the backflow prevention switch 9. Thus, when the power supply 2 is operating properly, the bypass switch 10 is turned ON, while the second switch 12, the first switch 11, and the backflow prevention switch 9 are turned OFF as shown in FIG. 3. On the other hand, when the power supply 2 has caused a failure, the bypass switch 10 is turned OFF, while the second switch 12, the first switch 11, and the backflow prevention switch 9 are turned ON. Furthermore, when the power supply 2 has recovered from the failure, the bypass switch the first switch 11, and the backflow prevention switch 9 are turned OFF, while the second switch 12 is turned ON.

(1-3) Description of Operation

Figure 4:
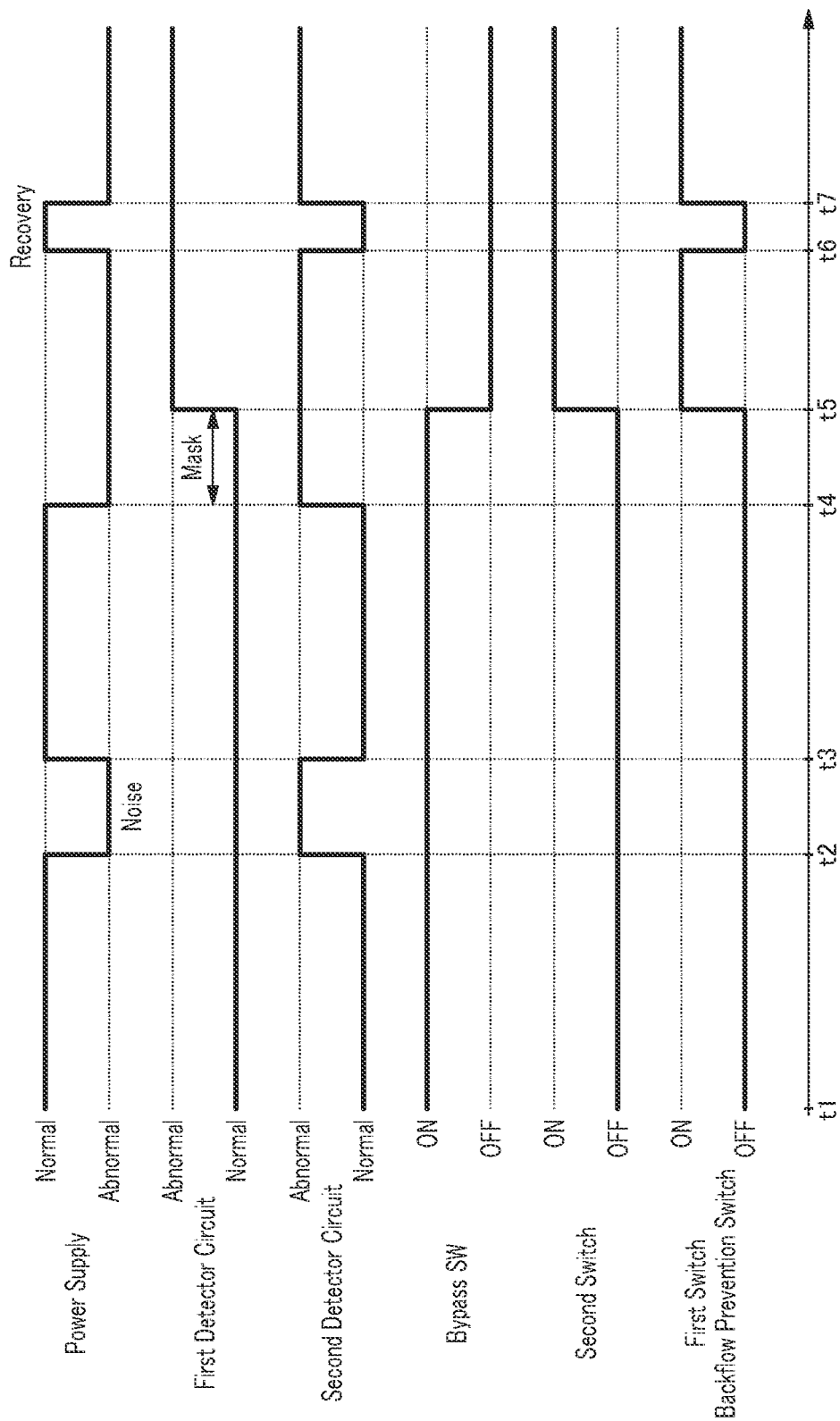
FIG. 4 is a timing chart showing how the state of a power supply, detection result provided by respective detector circuits, and the ON/OFF states of the respective switches may change with time.

An exemplary operation of the backup power supply system 1 will be described with reference to FIGS. 1, 3, and 4.

When the power supply 2 is operating properly (from a time t1 to a time t2 and from a time 3 to a time t4), the detection results provided by the first detector circuit 13 and the second detector circuit 14 both indicate "operating properly." In that case, the bypass switch 10 is turned ON based on the detection result provided by the first detector circuit 13. The second switch 12 is turned OFF based on the detection result provided by the first detector circuit 13. The first switch 11 and the backflow prevention switch 9 are turned OFF based on both the detection results provided by the first detector circuit 13 and the second detector circuit 14. As a result, the output current of the power supply 2 is supplied to the plurality of loads 3 through the first power supply line 41 and the second power supply line 42.

At this time, the first switch 11 is OFF. This prevents the output current of the power supply 2 from being diverted from the first branch node N1 on the first power supply line 41 into the second power supply line 42 and flowing into the first electrical storage device 5. In addition, since the backflow prevention switch 9 is OFF (i.e., operating in the backflow prevention mode), the backflow prevention switch 9 prevents the electric charge stored in the second electrical storage device 6 from the power supply 2 via the backflow prevention switch 9 from flowing backward toward the first load 31. This allows the output current of the power supply 2 to be supplied to the second load 32 sufficiently.

When noise is generated in the output voltage of the power supply 2 (from the time t2 to the time t3), the detection result provided by the first detector circuit 13 is not affected by the noise due to the masking function of the first detector circuit 13, and therefore, remains "operating properly." On the other hand, the second detector circuit 14 has no masking function, and therefore, is highly likely to be affected by the noise and erroneously detect that the power supply 2 has caused a failure. That is to say, when noise is generated, the detection result provided by the second detector circuit 14 is "failure." Therefore, when noise is generated, the bypass switch 10 is turned ON based on the detection result provided by the first detector circuit 13. The second switch 12 is turned OFF based on the detection result provided by the first detector circuit 13. The first switch 11 and the backflow prevention switch 9 are turned OFF based on both the detection results provided by the first detector circuit 13 and the second detector circuit 14. As a result, when noise is generated, as well as when the power supply 2 is operating properly, the output current of the power supply 2 is supplied to the plurality of loads 3.

When the power supply 2 causes a failure (i.e., when the output voltage of the power supply 2 becomes less than the threshold value) (at the time t4), the first detector circuit 13, having the masking function, does not detect the failure at the time t4 when the failure is caused by the power supply 2. It is not until the output voltage of the power supply 2 remains less than the threshold value for a predetermined time (at a time t5) since the failure was caused (at the time t4) that the first detector circuit 13 detects the failure. Thereafter, the first detector circuit 13, having the latching function, will output the same detection result continuously and fixedly since the time t5 when the failure is detected. Meanwhile, the second detector circuit 14, having no masking function, detects the failure caused by the power supply 2 and outputs the detection result as soon as the power supply 2 causes the failure (at the time t4). Therefore, in the interval between the time t4 when the power supply 2 has caused a failure and the time t5 when the first detector circuit 13 detects the failure, the ON/OFF states of the bypass switch 10, the second switch 12, the first switch 11, and the backflow prevention switch 9 are controlled in the same way as when the power supply 2 is operating properly. In that case, however, the power supply 2 outputs no power due to the failure, and the first electrical storage device 5 cannot supply power, either, since the first switch 11 and the second switch 12 are both OFF, and therefore, the output power of the second electrical storage device 6 is supplied to the second load 32.

As described above, when the first detector circuit 13 detects the failure at the time t5, the detection result provided by the first detector circuit 13 becomes "failure." In addition, at this time (i.e., at the time t5), the detection result provided by the second detector circuit 14 is also "failure." Thus, in the interval (t5-t6) between the time t5 when the first detector circuit 13 detects the failure and the time t6 when the power supply 2 recovers from the failure, the bypass switch 10 is turned OFF based on the detection result provided by the first detector circuit 13. The second switch 12 is turned ON based on the detection result provided by the first detector circuit 13. Meanwhile, the first switch 11 and the backflow prevention switch 9 are turned ON based on both detection results provided by the first detector circuit 13 and the second detector circuit 14.

As a result, in this case (from the time t5 to the time t6), the output current of the first electrical storage device 5 is delivered to the first power supply line 41 via the second power supply line 42 and then supplied to the plurality of loads 3 through the first power supply line 41. At this time, the bypass switch 10 is OFF. This prevents the output current of the first electrical storage device 5 from flowing backward through the first power supply line 41 and into the power supply 2. The output current of the first electrical storage device 5 is supplied to the second load 32 via the backflow prevention switch 9 in ON state. At that time, the backflow prevention switch 9 in ON state is in the low-voltage conductive mode. This may reduce the chances of the output current of the first electrical storage device 5 causing a voltage drop when the backflow prevention switch 9 is energized, compared to the backflow prevention switch 9 in OFF state (i.e., in the backflow prevention mode). Thus, in this case (from the time t5 to the time t6), the output voltage of the first electrical storage device 5 is output to the second load 32 while reducing a voltage drop at the backflow prevention switch 9. This allows the output voltage of the first electrical storage device 5 to sufficiently ensure the minimum guaranteed operating voltage for the second load 32.

When the power supply 2 recovers from the failure at the time t6, the detection result provided by the first detector circuit 13 still remains "failure" due to the latching function thereof. On the other hand, the second detector circuit 14, having neither the masking function nor the latching function, detects the recovery of the power supply 2 instantaneously and outputs the detection result. Thus, when the power supply 2 recovers from the failure (at the time t6), the detection result provided by the second detector circuit 14 turns into "operating properly." Consequently, when the power supply 2 recovers (at the time t6), the bypass switch 10 is turned OFF based on the detection result provided by the first detector circuit 13. The second switch 12 is turned ON based on the detection result provided by the first detector circuit 13. Meanwhile, the first switch 11 and the backflow prevention switch 9 are turned OFF based on both detection results provided by the first detector circuit 13 and the second detector circuit 14.

When the power supply 2 recovers, the output current of the power supply 2 energizes the internal diode 10D of the bypass switch 10 and is supplied to the plurality of loads 3 through the first power supply line 41. At that time, the output current of the power supply 2 is diverted from the first power supply line 41 into the second power supply line 42 but is prevented by the first switch 11 in OFF state from flowing into the first electrical storage device 5. In addition, when the power supply 2 recovers, the backflow prevention switch 9 operates in the backflow prevention mode. Thus, the backflow prevention switch 9 prevents the electric charge stored in the second electrical storage device 6 from the power supply 2 after having passed through the backflow prevention switch 9 from flowing backward toward the first load 31.

Thereafter, when the power supply 2 causes a failure once again at the time t7, the detection result provided by the first detector circuit 13 still remains "failure" due to the latching function thereof. On the other hand, the second detector circuit 14, having neither the masking function nor the latching function, detects the failure caused by the power supply 2 instantaneously and outputs the detection result. Thus, when the power supply 2 causes the failure once again (at the time t7), the detection result provided by the second detector circuit 14 turns into "failure." Consequently, when the power supply 2 causes the failure once again (at the time t7), the bypass switch 10 is turned OFF based on the detection result provided by the first detector circuit 13. The second switch 12 is turned ON based on the detection result provided by the first detector circuit 13. Meanwhile, the first switch 11 and the backflow prevention switch 9 are turned ON based on both detection results provided by the first detector circuit 13 and the second detector circuit 14.

Thus, in this case (from the time t7 on), as well as when the power supply 2 causes a failure from the time t5 to the time t6, the output current of the first electrical storage device 5 is delivered through the second power supply line 42 to the first power supply line 41 and supplied to the plurality of loads 3. At that time, the backflow prevention switch 9 in ON state operates in the low-voltage conductive mode, and therefore, the output voltage of the first electrical storage device 5 is supplied to the second load 32 while reducing a voltage drop at the backflow prevention switch 9. This allows the output voltage of the first electrical storage device 5 to sufficiently ensure the minimum guaranteed operating voltage for the second load 32.

(1-4) Major Advantages

As can be seen from the foregoing description, a backup power supply system 1 according to this embodiment is designed to supply, when a power supply 2 has caused a failure, power from a first electrical storage device 5 to a plurality of loads 3. The power supply 2 is connected to not only a first power supply line 41 but also the plurality of loads 3 through the first power supply line 41. The first electrical storage device 5 is connected to not only a second power supply line 42 connected to the first power supply line 41 but also the plurality of loads 3 through the first power supply line 41. The plurality of loads 3 includes a first load 31 and a second load 32. The first load 31 and the second load 32 are connected to the first power supply line 41. The backup power supply system 1 includes a backflow prevention switch 9. The backflow prevention switch 9 is provided between the first load 31 and the second load 32 on the first power supply line 41 and makes the first power supply line 41 electrically conductive or non-conductive by turning ON and OFF. The backflow prevention switch 9 includes an internal diode 9D. The internal diode 9D has an anode connected to one side including the first load 31 and a cathode connected to the other side including the second load 32.

According to this configuration, turning the backflow prevention switch 9 ON when supplying power from the first electrical storage device 5 to the plurality of loads 3 may reduce the chances of the output voltage of the first electrical storage device 5 causing a voltage drop at the backflow prevention switch 9. This enables, when the first electrical storage device 5 supplies power, supplying a voltage to the second load 32 while reducing the chances of the output voltage of the first electrical storage device 5 causing a voltage drop.

The backup power supply system 1 further includes a first switch 11, a first detector circuit 13, and a second detector circuit 14. The first switch 11 is provided on the second power supply line 42 and makes the second power supply line 42 electrically conductive or non-conductive by turning ON and OFF. The first detector circuit 13 and the second detector circuit 14 detect, under mutually different detection conditions, the failure caused by the power supply 2 and output respective detection results. The first switch 11 is controlled based on the respective detection results provided by the first detector circuit 13 and the second detector circuit 14.

This configuration enables more accurately determining, based on the detection results provided by the first detector circuit 13 and the second detector circuit 14 that detect the failure of the power supply 2 under mutually different detection conditions, whether the power supply 2 has recovered from the failure. This allows the first switch 11 to be turned OFF when the power supply 2 recovers from the failure. Consequently, the first switch 11 may prevent the output current of the power supply 2 from being diverted into the second power supply line and flowing into the first electrical storage device 5 when the power supply 2 recovers from the failure. In addition, this configuration also allows, even if the first switch 11 is turned OFF, the internal diode 11D to continue supplying power from the first electrical storage device 5. This enables, even when the power supply 2 causes a failure once again, supplying backup power from the first electrical storage device 5 instantaneously. Consequently, this enables supplying backup power from the first electrical storage device 5 immediately even if the power supply 2 that has once recovered from the failure falls into a failure state once again soon.

(1-5) Variations

Next, variations of the exemplary embodiment will be described.

(First Variation)

In the exemplary embodiment described above, the first electrical storage device 5 may be a secondary battery such as a lithium-ion capacitor (LIC) or a lithium-ion battery (LIB). In the lithium-ion capacitor, the cathode thereof may be made of the same material (such as activated carbon) as an EDLC and the anode thereof may be made of the same material (e.g., a carbon material such as graphite) as an LIB.

Also, the first electrical storage device 5 does not have to be an electrical double layer capacitor (EDLC) but may also be an electrochemical device having a configuration to be described below. As used herein, the "electrochemical device" includes a cathode member, an anode member, and a nonaqueous electrolyte solution. The cathode member includes a cathode current collector and a cathode material layer supported by the cathode current collector and containing a cathode active material. The cathode material layer contains a conductive polymer serving as a cathode active material for doping and de-doping an anion (dopant). The anode member includes an anode material layer containing an anode active material. The anode active material may be, for example, a material that advances an oxidation-reduction reaction involving occlusion and release of a lithium ion. Specifically, examples of the anode active material include carbon materials, metal compounds, alloys, and ceramics. The nonaqueous electrolyte solution may have, for example, lithium-ion conductivity. A nonaqueous electrolyte solution of this type includes a lithium salt and a nonaqueous solution that dissolves the lithium salt. An electrochemical device having such a configuration has a higher energy density than an electrical double layer capacitor, for example.

(2) Second Embodiment

A backup power supply system 1 according to a second embodiment will be described with reference to FIGS. 5 and 6. The following description will be focused on differences from the first embodiment, and any constituent element of the second embodiment, having the same function as a counterpart of the first embodiment described above, will be designated by the same reference numeral as that counterpart's, and description thereof will be omitted herein.

(2-1) Description of Configuration

Figure 5:
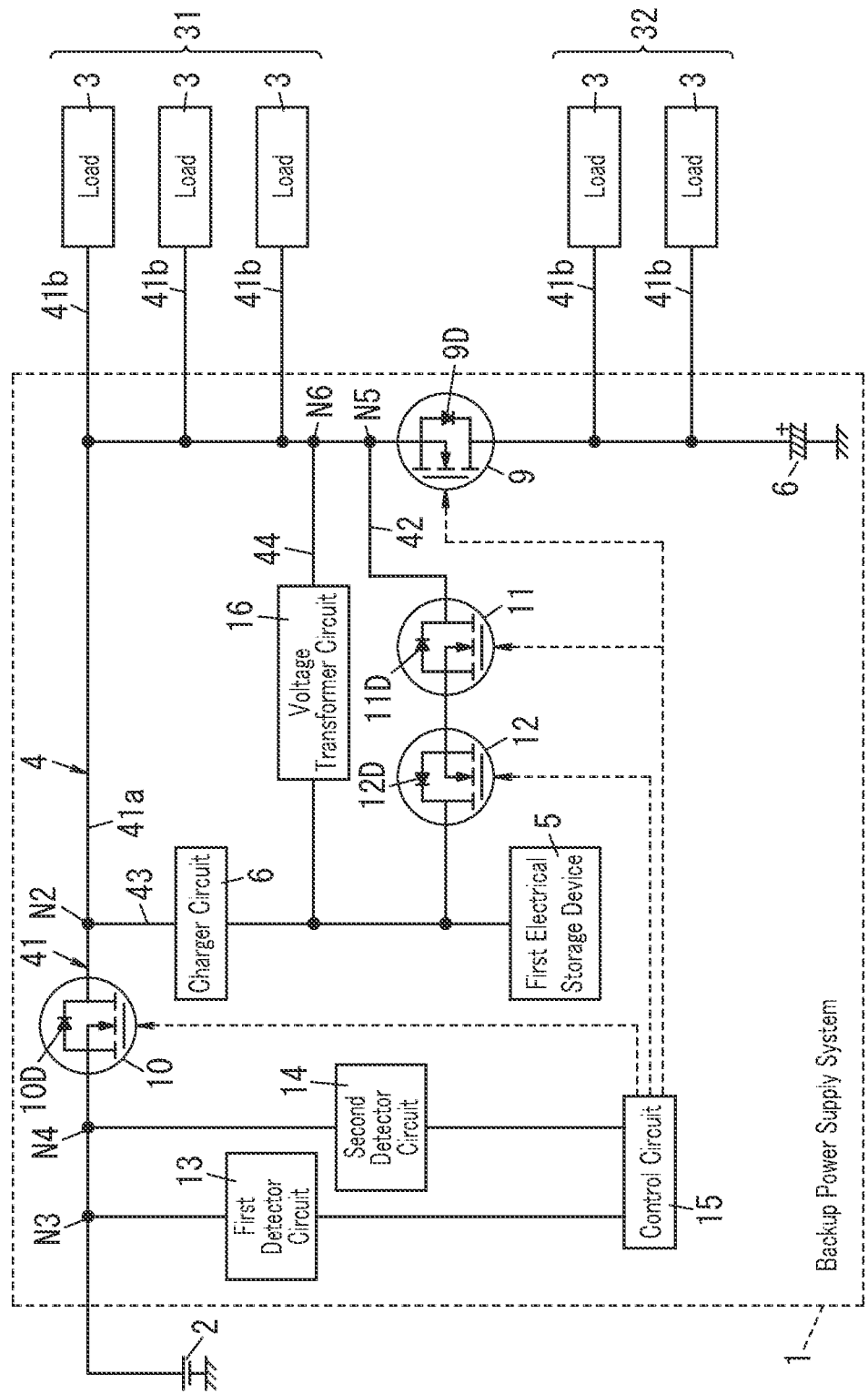
FIG. 5 is a block diagram of a backup power supply system according to a second embodiment.
Figure 6:
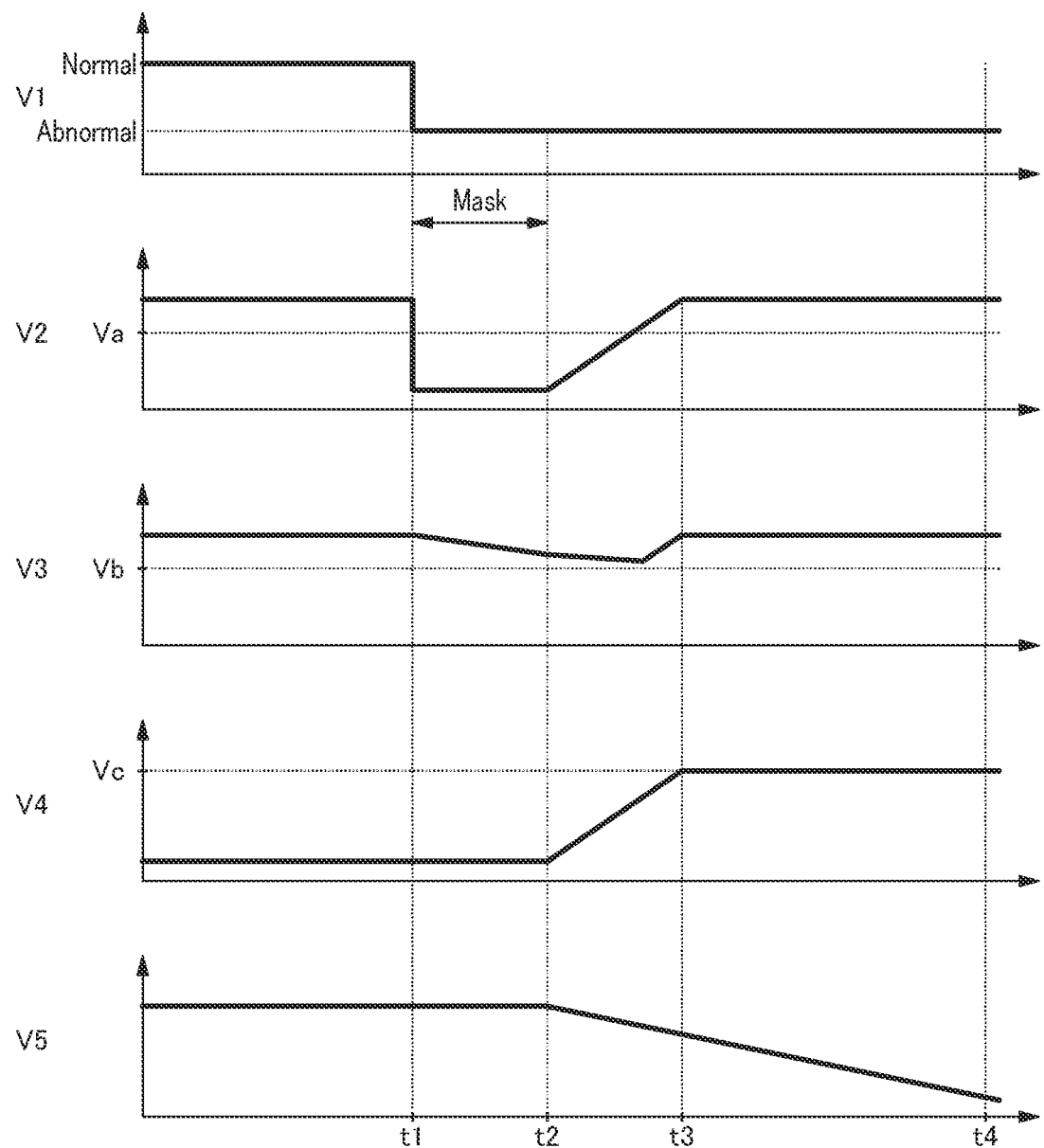
FIG. 6 is a timing chart showing how respective voltages may change with time in the backup power supply system.

As shown in FIG. 5, a backup power supply system 1 according to the second embodiment further includes a voltage transformer circuit 16.

In addition, in this embodiment, the second power supply line 42 connects an input/output interface of the first electrical storage device 5 to a fifth branch node N5 on the first power supply line 41. Furthermore, in this embodiment, the power supply line 4 further includes a fourth power supply line 44. The fourth power supply line 44 connects the input/output interface of the first electrical storage device 5 to a sixth branch node N6 on the first power supply line 41. The fifth branch node N5 and the sixth branch node N6 are arranged between the first load 31 and the backflow prevention switch 9 on the first power supply line 41. The fourth power supply line 44 is provided with the voltage transformer circuit 16. The second power supply line 42 is provided in parallel with the voltage transformer circuit 16 between the input/output interface of the first electrical storage device 5 and the first power supply line 41. This allows the second power supply line 42 to supply the output voltage of the first electrical storage device 5 to the plurality of loads 3 not via the voltage transformer circuit 16.

The voltage transformer circuit 16 is a step up (transformer) circuit for boosting (transforming) the output voltage of the first electrical storage device 5 and may be, for example, a DC-DC converter. The voltage transformer circuit 16 is provided on the fourth power supply line 44. The voltage transformer circuit 16 is selectively activated and deactivated under the control of the control circuit 15. When activated, the voltage transformer circuit 16 boosts the output voltage of the first electrical storage device 5 to a predetermined voltage Vc and outputs the predetermined voltage Vc to the first power supply line 41 through the fourth power supply line 44. This allows the output voltage of the voltage transformer circuit 16 to be supplied to the plurality of loads 3. The predetermined voltage Vc may be, for example, a voltage (e.g., 12 V) slightly higher than the minimum guaranteed operating voltage (e.g., 11.5 V) of the second load 32. Having the output voltage of the first electrical storage device 5 boosted by the voltage transformer circuit 16 to the predetermined voltage Vc allows, even if the output voltage of the first electrical storage device 5 has decreased, the voltage supplied from the first electrical storage device 5 to the second load 32 to be maintained at a voltage equal to or higher than the minimum guaranteed operating voltage of the second load 32.

(2-2) Description of Operation

An exemplary operation of the backup power supply system 1 according to this embodiment will be described with reference to FIGS. 5 and 6.

At a time t1, the power supply 2 causes a failure, thus making the output voltage V1 of the power supply 2 lower than a threshold value. This makes the voltage V2 supplied to the first load 31 lower than a required voltage Va for the first load 31. However, the output voltage of the second electrical storage device 6 ensures that the voltage supplied to the second load 32 is equal to or higher than a required voltage (minimum guaranteed operating voltage) Vb for the second load 32. At this time t1 when the failure is caused, the first detector circuit 13 does not detect the failure due to the masking function thereof and only the second detector circuit 14 detects the failure.

Thereafter, at a time t2 when a predetermined time (i.e., a predetermined duration of the masking function) passes since the power supply 2 has caused the failure, the first detector circuit 13 detects the failure. That is to say, at the time t2, the respective detection result provided by the first detector circuit 13 and the second detector circuit 14 both turn into "failure." This turns the bypass switch 10 OFF, turns the first switch 11, the second switch 12, and the backflow prevention switch 9 ON, and enables (i.e., starts to activate) the voltage transformer circuit 16.

Note that in the interval between the times t1 and t2, the supply voltage V3 for the second load 32 is ensured by the output voltage of the second electrical storage device 6. However, as the output voltage of the second electrical storage device 6 decreases due to electrical discharge, the supply voltage V3 also decreases within a range exceeding the minimum guaranteed operating voltage Vb for the second load 32.

As the voltage transformer circuit 16 is enabled (i.e., starts to be activated), the output voltage V5 of the first electrical storage device 5 is delivered through the fourth power supply line 44 (i.e., boosted by the voltage transformer circuit 16) to the first power supply line 41 and supplied to the plurality of loads 3. In addition, while the output voltage V5 is being supplied to the plurality of loads 3, turning the first switch 11 and the second switch 12 ON causes the output voltage V5 of the first electrical storage device 5 to be delivered through the second power supply line 42 (i.e., not via the voltage transformer circuit 16) to the first power supply line 41 and supplied to the plurality of loads 3.

That is to say, in the interval (of 100 milliseconds (ms), for example) between a time when the voltage transformer circuit 16 starts to be activated and a time when the voltage transformer circuit 16 is fully activated, the output voltage V4 of the voltage transformer circuit 16 has not been boosted sufficiently and is still lower than the output voltage V5 of the first electrical storage device 5. Thus, until the output voltage of the voltage transformer circuit 16 reaches the predetermined voltage Vc, the output voltage V5 of the first electrical storage device 5 is delivered through the second power supply line 42 to the plurality of loads 3. At this time, the voltage of the first electrical storage device 5 fully charged is equal to or higher than the required voltages for the first load 31 and the second load 32. Thus, the supply voltage may be output sufficiently to the loads 3 for a while, even if the output voltage V5 of the first electrical storage device 5 is not boosted.

Thereafter, at a time t3 when a predetermined time passes since the voltage transformer circuit 16 started to be activated at the time t2, the first switch 11 and the backflow prevention switch 9 are turned OFF. That is to say, when the predetermined time passes since the voltage transformer circuit 16 started to be activated (at the time t2), the voltage transformer circuit 16 is fully activated and the output voltage V4 of the voltage transformer circuit 16 is boosted to the predetermined voltage Vc. Thus, the backflow prevention switch 9 is turned OFF to return to the backflow prevention mode. In addition, to prevent the output current of the voltage transformer circuit 16 from flowing backward from the fifth branch node N5 on the first power supply line 41 toward the second power supply line 42, the first switch 11 is turned OFF.

Note that in the interval between the times t2 and t3, the supply voltage V3 for the second load 32 is ensured by both the output voltages of the first electrical storage device 5 and the second electrical storage device 6. Thus, in the first half of the interval between the times t2 and t3, the supply voltage V3 decreases more gently than in the interval between the times t1 and t2 due to the electrical discharge of the first electrical storage device 5 and the second electrical storage device 6. In the second half of the interval between the times t2 and t3, however, the output voltage of the voltage transformer circuit 16 exceeds the output voltage of the first electrical storage device 5 and ensures the supply voltage V3, and therefore, the supply voltage V3 increases. That is to say, the supply voltage V3 decreases gently in the first half of the interval between the times t2 and t3 and increases in the second half thereof.

Note that by the time t3 when the predetermined time passes since the power supply 2 caused a failure (at a time t1), the supply voltage V2 for the first load 31 may be lower than the required voltage Va. However, this interval (between the times t1 and t3) is shorter than an interval in which the supply of the voltage to the first load 31 is allowed to be suspended.

As can be seen, in the interval between the time t2 when the voltage transformer circuit 16 starts to be activated and the time t3 when the voltage transformer circuit 16 is fully activated, the output voltage V5 of the first electrical storage device 5 is not boosted sufficiently by the voltage transformer circuit 16. However, the voltage of the first electrical storage device 5 fully charged is higher than the minimum guaranteed operating voltage for the second load 32. Thus, the supply voltage V3 supplied from the first electrical storage device 5 to the second load 32 through the second power supply line 42 is maintained at a voltage equal to or higher than the minimum guaranteed operating voltage for the second load 32 for a while. Thus, the output voltage V5 of the first electrical storage device 5 may reduce the chances of the voltage V3 supplied to the second load 32 being discontinued in the interval between the time t2 when the voltage transformer circuit 16 starts to be activated and the time t3 when the voltage transformer circuit 16 is fully activated. In addition, in this interval between the times t2 and t3, the output voltage of the second electrical storage device 6 may also reduce the chances of the voltage V3 supplied to the second load 32 being discontinued. Then, after the voltage transformer circuit 16 has been fully activated (i.e., from the time t3 and on), the output voltage V5 of the first electrical storage device 5 is boosted by the voltage transformer circuit 16 to the predetermined voltage Vc. Thus, even if the output voltage V5 of the first electrical storage device 5 decreases, the output voltage V5 is still maintained at a voltage equal to or higher than the minimum guaranteed operating voltage for the second load 32.

As can be seen, according to this embodiment, when the power supply 2 causes a failure, the voltage supplied to the plurality of loads 3 is ensured by the output voltage V5 of the first electrical storage device 5 that has been boosted by the voltage transformer circuit 16. However, it takes some time for the voltage transformer circuit 16 to boost the output voltage V5 of the first electrical storage device 5 to the predetermined voltage Vc since the voltage transformer circuit 16 started to be activated at the time t2. Thus, in the meantime (i.e., in the interval between the times t2 and t3), the output voltage of the second electrical storage device 6 (electrolytic capacitor) ensures that the supply voltage V3 for the second load 32 is equal to or higher than the minimum guaranteed operating voltage Vb. In addition, the output voltage V5 of the first electrical storage device 5 to be supplied through the second power supply line 42 (i.e., not via the voltage transformer circuit 16) also ensures the voltage (supply voltage) V3 to be supplied to the second load 32. This ensures the supply voltages V2, V3 for the plurality of loads 3 even when the power supply 2 has caused a failure. In particular, this allows the supply voltage V3 for the second load 32 to be maintained at a voltage equal to or higher than the minimum guaranteed operating voltage Vb without a break.

(3) Recapitulation

The exemplary embodiments and their variations described above are specific implementations of the following aspects of the present disclosure.

A backup power supply system (1) according to a first aspect is designed to supply, when a power supply (2) has caused a failure, power from a first electrical storage device (5) to a plurality of loads (3). The power supply (2) is connected to not only a first power supply line (41) but also the plurality of loads (3) through the first power supply line (41). The first electrical storage device (5) is connected to not only a second power supply line (42) connected to the first power supply line (41) but also the plurality of loads (3) through the first power supply line (41). The plurality of loads (3) includes a first load (31) and a second load (32). The first load (31) and the second load (32) are connected to the first power supply line (41). The backup power supply system (1) includes a backflow prevention switch (9). The backflow prevention switch (9) is provided between the first load (31) and the second load (32) on the first power supply line (41) and makes the first power supply line (41) electrically conductive or non-conductive by turning ON and OFF. The backflow prevention switch (9) includes an internal diode (9D) having an anode connected to one side including the first load (31) and a cathode connected to the other side including the second load (32).

According to this configuration, turning the backflow prevention switch (9) ON when supplying power from the first electrical storage device (5) to the plurality of loads (3) may reduce the chances of the output voltage of the first electrical storage device (5) causing a voltage drop at the backflow prevention switch (9). This enables, when the first electrical storage device (5) supplies power, supplying a voltage to the second load (32) (as a particular load) while reducing the chances of the output voltage of the first electrical storage device (5) causing a voltage drop.

In a backup power supply system (1) according to a second aspect, which may be implemented in conjunction with the first aspect, the first load (31) includes an actuator to be energized with power supplied. The second load (32) is a control system load that controls the actuator.

This configuration allows a control system load to be adopted as the second load (32) (i.e., a particular load).

A backup power supply system (1) according to a third aspect, which may be implemented in conjunction with the first or second aspect, further includes a second electrical storage device (6) connected to the cathode of the backflow prevention switch (9) on the first power supply line (41) and supplying power to the second load (32).

This configuration enables compensating for the shortage of the output voltage of the first electrical storage device (5) with the output voltage of the second electrical storage device (6), thus enabling supplying voltage to the second load (32) even more continuously.

A backup power supply system (1) according to a fourth aspect, which may be implemented in conjunction with any one of the first to third aspects, includes a first detector circuit (13) and a second detector circuit (14). The first detector circuit (13) outputs, once detecting the failure caused by the power supply (2), a result of such detection as a detection result continuously and fixedly. The second detector circuit (14) outputs, whenever detecting the failure caused by the power supply (2), a result of such detection as a detection result. The backflow prevention switch (9) is turned ON when the detection results provided by the first detector circuit (13) and the second detector circuit (14) both indicate that the power supply (2) has caused the failure and is turned OFF otherwise.

This configuration allows the backflow prevention switch (9) to be turned OFF when the power supply (2) is operating properly (as well as when the power supply (2) recovers from the failure) and to be turned ON when the power supply (2) has caused the failure.

In a backup power supply system (1) according to a fifth aspect, which may be implemented in conjunction with the fourth aspect, the first detector circuit (13) detects the failure caused by the power supply (2) when detecting that an output voltage of the power supply (2) has been less than a threshold value for a predetermined time.

This configuration enables reducing the effect of the noise included in the output voltage of the power supply (2) on the detection result provided by the first detector circuit (13). This allows the control circuit to more accurately determine whether the power supply (2) is operating properly or has caused a failure.

A backup power supply system (1) according to a sixth aspect, which may be implemented in conjunction with the fourth or fifth aspect, further includes a first switch (11) provided on the second power supply line (42) and making the second power supply line (42) electrically conductive or non-conductive by turning ON and OFF. The first switch (11) includes an internal diode (11D) having a cathode connected to one side including the first power supply line (41) and an anode connected to the other side including the first electrical storage device (5).

This configuration enables, by turning the first switch (11) OFF when the power supply recovers from the failure, preventing the output current of the power supply (2) from being diverted into the second power supply line (42) and flowing into the first electrical storage device (5) when the power supply (2) recovers from the failure.

In a backup power supply system (1) according to a seventh aspect, which may be implemented in conjunction with the sixth aspect, the first switch (11) is turned ON when the detection results provided by the first detector circuit (13) and the second detector circuit (14) both indicate that the power supply (2) has caused the failure and is turned OFF otherwise.

This configuration allows the first switch (11) to be turned OFF when the power supply (2) recovers from the failure.

A backup power supply system (1) according to an eighth aspect is designed to, when a power supply (2) has caused a failure, supply power from a first electrical storage device (5) to a plurality of loads (3). The power supply (2) is connected to not only a first power supply line (41) but also the plurality of loads (3) through the first power supply line (41). The first electrical storage device (5) is connected to not only a second power supply line (42) connected to the first power supply line (41) but also the plurality of loads (3) through the first power supply line (41). The backup power supply system (1) includes a first switch (11), a first detector circuit (13), and a second detector circuit (14). The first switch (11) is provided on the second power supply line (42) and makes the second power supply line (42) electrically conductive or non-conductive by turning ON and OFF. The first detector circuit (13) and the second detector circuit (14) detect, under mutually different detection conditions, the failure caused by the power supply (2) and output respective detection results. The first switch (11) is controlled based on the respective detection results provided by the first detector circuit (13) and the second detector circuit (14).

This configuration enables more accurately determining, based on the detection results provided by the first detector circuit (13) and the second detector circuit (14) that detect the failure of the power supply (2) under mutually different detection conditions, whether the power supply (2) has recovered from the failure. This allows the first switch (11) to be turned OFF when the power supply (2) recovers from the failure. Consequently, the first switch (11) may prevent the output current of the power supply (2) from being diverted into the second power supply line (42) and flowing into the first electrical storage device (5) when the power supply (2) recovers from the failure.

In a backup power supply system (1) according to a ninth aspect, which may be implemented in conjunction with the eighth aspect, the first detector circuit (13) outputs, once detecting the failure caused by the power supply (2), a result of such detection as the detection result continuously and fixedly. The second detector circuit (14) outputs, whenever detecting the failure caused by the power supply (2), a result of such detection as the detection result.

This configuration enables more accurately determining, using the detection results provided by the first detector circuit (13) and the second detector circuit (14) in combination, whether the power supply (2) has recovered from the failure.

In a backup power supply system (1) according to a tenth aspect, which may be implemented in conjunction with the ninth aspect, the first detector circuit (13) detects the failure caused by the power supply (2) when detecting that an output voltage of the power supply (2) has been less than a threshold value for a predetermined time.

This configuration enables reducing the effect of the noise included in the output voltage of the power supply (2) on the detection result provided by the first detector circuit (13).

In a backup power supply system (1) according to an eleventh aspect, which may be implemented in conjunction with any one of the eighth to tenth aspects, the first switch (11) is turned ON when the detection results provided by the first detector circuit (13) and the second detector circuit (14) both indicate that the power supply (2) has caused the failure and is turned OFF otherwise.

This configuration allows the control circuit to more accurately determine whether the power supply (2) has recovered from the failure. This enables, by turning the first switch (11) OFF, preventing the output current of the power supply (2) from being diverted into the second power supply line (42) and flowing into the first electrical storage device (5) when the power supply (2) recovers from the failure.

In a backup power supply system (1) according to a twelfth aspect, which may be implemented in conjunction with any one of the eighth to eleventh aspects, the first switch (11) includes an internal diode (11D) having an anode connected to one side including the first electrical storage device (5) and a cathode connected to the other side including the first power supply line (41).

This configuration enables, even if the first switch (11) includes the internal diode (11D), preventing the output current of the power supply (2) from being diverted into the second power supply line (42) and flowing into the first electrical storage device (5) by turning the first switch (11) OFF when the power supply (2) recovers from the failure.

A backup power supply system (1) according to a thirteenth aspect, which may be implemented in conjunction with any one of the fourth to twelfth aspects, further includes a second switch (12). The second switch (12) makes the second power supply line (42) electrically conductive or non-conductive by turning ON and OFF. The second switch (12) includes an internal diode (12D) having a cathode connected to one side including the first electrical storage device (5) and an anode connected to the other side including the first power supply line (41).

This configuration enables, by turning the second switch (12) OFF when the power supply (2) is operating properly, preventing the output current of the first electrical storage device (5) from being supplied to the plurality of loads (3) while the power supply (2) is operating properly. In addition, this configuration also enables, by turning the second switch (12) ON when the power supply (2) has caused a failure, supplying the output current of the first electrical storage device (5) to the plurality of loads (3) when the power supply (2) has caused a failure.

In a backup power supply system (1) according to a fourteenth aspect, which may be implemented in conjunction with the thirteenth aspect, the second switch (12) is turned OFF when the detection result provided by the first detector circuit (13) indicates that the power supply (2) is operating properly and is turned ON when the detection result provided by the first detector circuit (13) indicates that the power supply (2) has caused the failure.

This configuration allows the second switch to be turned OFF when the power supply (2) is operating properly, thus enabling preventing the output current of the first electrical storage device (5) from being supplied to the plurality of loads (3) while the power supply (2) is operating properly. In addition, this configuration also allows the second switch (12) to be turned ON when the power supply (2) has caused a failure, thus enabling supplying the output current of the first electrical storage device (5) to the plurality of loads (3) when the power supply (2) has caused a failure.

A backup power supply system (1) according to a fifteenth aspect, which may be implemented in conjunction with any one of the fourth to fourteenth aspects, further includes a bypass switch (10). The bypass switch (10) is provided between the power supply (2) and the plurality of loads (3) on the first power supply line (41) and makes the first power supply line (41) electrically conductive or non-conductive by turning ON and OFF. The bypass switch (10) includes an internal diode (10D) having an anode connected to one side including the power supply (2) and a cathode connected to the other side including the plurality of loads (3).

This configuration enables, by turning the bypass switch (10) ON when the power supply (2) is operating properly, supplying the output current of the power supply (2) to the plurality of loads (3) while the power supply (2) is operating properly. In addition, this configuration also enables, by turning the bypass switch (10) OFF when the power supply (2) has caused a failure, preventing the output current of the power supply (2) from being supplied to the plurality of loads (3) when the power supply (2) has caused a failure. Furthermore, this configuration also allows the internal diode (10D) to prevent the output current of the first electrical storage device (5) from flowing backward toward the power supply (2).

In a backup power supply system (1) according to a sixteenth aspect, which may be implemented in conjunction with the fifteenth aspect, the bypass switch (10) is turned ON when the detection result provided by the first detector circuit (13) indicates that the power supply (2) is operating properly and is turned OFF when the detection result provided by the first detector circuit (13) indicates that the power supply (2) has caused the failure.

This configuration allows the bypass switch (10) to be turned ON when the power supply (2) is operating properly, thus enabling supplying the output current of the power supply (2) to the plurality of loads (3) while the power supply (2) is operating properly. In addition, this configuration also allows the bypass switch (10) to be turned OFF when the power supply (2) has caused a failure, thus enabling preventing the output current of the power supply (2) from being supplied to the plurality of loads (3) when the power supply (2) has caused a failure.

A backup power supply system (1) according to a seventeenth aspect, which may be implemented in conjunction with any one of the first to sixteenth aspects, further includes a voltage transformer circuit (16). The voltage transformer circuit (16) transforms an output voltage of the first electrical storage device (5) and outputs the voltage thus transformed to the first power supply line (41).

This configuration allows the voltage transformer circuit (16) to transform the output voltage of the first electrical storage device (5) and supply the voltage thus transformed to the plurality of loads (3). Thus, the first electrical storage device (5) may supply a sufficiently large voltage to the plurality of loads (3).

In a backup power supply system (1) according to an eighteenth aspect, which may be implemented in conjunction with the seventeenth aspect, the second power supply line (42) is connected in parallel to the voltage transformer circuit (16) between the first electrical storage device (5) and the first power supply line (41).

This configuration allows the second power supply line (42) to supply the output voltage of the first electrical storage device (5) to the plurality of loads (3), not via the voltage transformer circuit (16).

A backup power supply system (1) according to a nineteenth aspect, which may be implemented in conjunction with any one of the first to eighteenth aspects, includes the first electrical storage device (5).

This configuration enables providing a backup power supply system (1) including the first electrical storage device (5) on the second power supply line (42).

A moving vehicle (100) according to a twentieth aspect includes the backup power supply system (1) according to any one of the first to nineteenth aspects and a moving vehicle body (101).

This configuration enables providing a moving vehicle (100) including the backup power supply system (1) described above.

REFERENCE SIGNS LIST

1 Backup Power Supply System
2 Power Supply
3 Load
5 First Electrical Storage Device
6 Second Electrical Storage Device
9 Backflow Prevention Switch
9D Internal Diode
10 Bypass Switch
10D Internal Diode
11 First Switch
11D Internal Diode
12 Second Switch
12D Internal Diode
13 First Detector Circuit
14 Second Detector Circuit
16 Voltage Transformer Circuit
31 First Load
32 Second Load
41 First Power Supply Line
42 Second Power Supply Line
100 Moving Vehicle
101 Moving Vehicle Body

The invention claimed is:

1. A backup power supply system configured to, when a power supply has caused a failure, supply power from a first electrical storage device to a plurality of loads,
the power supply being connected to not only a first power supply line but also the plurality of loads through the first power supply line,
the first electrical storage device being connected to not only a second power supply line connected to the first power supply line but also the plurality of loads through the first power supply line,
the plurality of loads including a first load and a second load both connected to the first power supply line,
the backup power supply system comprising:
a backflow prevention switch provided between the first load and the second load on the first power supply line and configured to make the first power supply line electrically conductive or non-conductive by turning ON and OFF,
a first detector circuit configured to, once detecting the failure caused by the power supply, output a result of detection as a detection result continuously and fixedly,
a second detector circuit configured to, whenever detecting the failure caused by the power supply, output a result of detection as a detection result; and
a first switch provided on the second power supply line and configured to make the second power supply line electrically conductive or non-conductive by turning ON and OFF, wherein:
the backflow prevention switch includes an internal diode having an anode connected to one side including the first load and a cathode connected to the other side including the second load,
the backflow prevention switch is turned ON when the detection results provided by the first detector circuit and the second detector circuit both indicate that the power supply has caused the failure and is turned OFF otherwise,
the first switch includes an internal diode having a cathode connected to one side including the first power supply line and an anode connected to the other side including the first electrical storage device, and
the first switch is turned ON when the detection results provided by the first detector circuit and the second detector circuit both indicate that the power supply has caused the failure and is turned OFF otherwise.

2. The backup power supply system of claim 1, wherein the first load includes an actuator configured to be energized with power supplied, and
the second load is a control system load configured to control the actuator.

3. The backup power supply system of claim 1, further comprising a second electrical storage device connected to the cathode of the backflow prevention switch on the first power supply line and configured to supply power to the second load.

4. The backup power supply system of claim 1, wherein the first detector circuit is configured to detect the failure caused by the power supply when detecting that an output voltage of the power supply has been less than a threshold value for a predetermined time.

5. A backup power supply system configured to, when a power supply has caused a failure, supply power from a first electrical storage device to a plurality of loads,
the power supply being connected to not only a first power supply line but also the plurality of loads through the first power supply line,
the first electrical storage device being connected to not only a second power supply line connected to the first power supply line but also the plurality of loads through the first power supply line,
the backup power supply system comprising:
a first switch provided on the second power supply line and configured to make the second power supply line electrically conductive or non-conductive by turning ON and OFF; and
a first detector circuit and a second detector circuit configured to detect, under mutually different detection conditions, the failure caused by the power supply and output respective detection results,
the first switch being controlled based on the respective detection results provided by the first detector circuit and the second detector circuit, and
the first switch is turned ON when the detection results provided by the first detector circuit and the second detector circuit both indicate that the power supply has caused the failure and is turned OFF otherwise.

6. The backup power supply system of claim 5, wherein
the first detector circuit is configured to, once detecting the failure caused by the power supply, output a result of detection as the detection result continuously and fixedly, and
the second detector circuit is configured to, whenever detecting the failure caused by the power supply, output a result of detection as the detection result.

7. The backup power supply system of claim 6, wherein the first detector circuit is configured to detect the failure caused by the power supply when detecting that an output voltage of the power supply has been less than a threshold value for a predetermined time.

8. The backup power supply system of claim 5, wherein the first switch includes an internal diode having an anode connected to one side including the first electrical storage device and a cathode connected to the other side including the first power supply line.

9. The backup power supply system of claim 1, further comprising a second switch configured to make the second power supply line electrically conductive or non-conductive by turning ON and OFF, wherein
the second switch includes an internal diode having a cathode connected to one side including the first electrical storage device and an anode connected to the other side including the first power supply line.

10. The backup power supply system of claim 9, wherein the second switch is turned OFF when the detection result provided by the first detector circuit indicates that the power supply is operating properly and is turned ON when the detection result provided by the first detector circuit indicates that the power supply has caused the failure.

11. The backup power supply system of claim 1, further comprising a bypass switch provided between the power supply and the plurality of loads on the first power supply line and configured to make the first power supply line electrically conductive or non-conductive by turning ON and OFF, wherein
the bypass switch includes an internal diode having an anode connected to one side including the power supply and a cathode connected to the other side including the plurality of loads.

12. The backup power supply system of claim 11, wherein the bypass switch is turned ON when the detection result provided by the first detector circuit indicates that the power supply is operating properly and is turned OFF when the detection result provided by the first detector circuit indicates that the power supply has caused the failure.

13. The backup power supply system of claim 1, further comprising a voltage transformer circuit configured to transform an output voltage of the first electrical storage device and output the voltage thus transformed to the first power supply line.

14. The backup power supply system of claim 13, wherein the second power supply line is connected in parallel to the voltage transformer circuit between the first electrical storage device and the first power supply line.

15. The backup power supply system of claim 1, comprising the first electrical storage device.

16. A moving vehicle comprising:
the backup power supply system of claim 1; and
a moving vehicle body.

* * * * *